SUPPRESSED CARRIER SINGLE-SIDEBAND TRANSMISSION SYSTEM

Filed May 26, 1959

INVENTOR
YME BOUWINUS FOLKERT JAN GROENEVELD
AILDERT ALBERT POTJER
BY
AGENT

United States Patent Office 3,084,328

Patented Apr. 2, 1963

3,084,328

SUPPRESSED CARRIER SINGLE-SIDEBAND TRANSMISSION SYSTEM

Yme Bouwinus Folkert Jan Groeneveld and Aildert Albert Potjer, Hilversum, Netherlands, assignors to North American Philips Company, Inc., New York, N.Y., a corporation of Delaware Filed May 26, 1959, Ser. No. 815,863
Claims priority, application Netherlands June 12, 1958
5 Claims. (Cl. 325—49)

Figure 1:
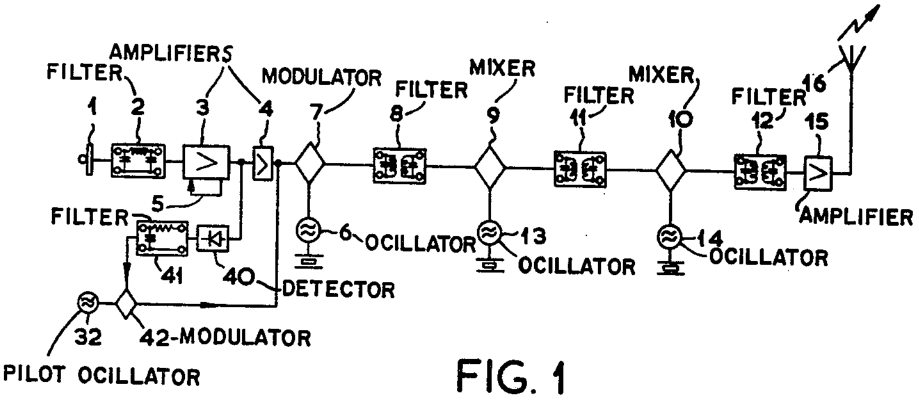

This invention relates to a radio transmission system for single-sideband transmission with suppressed carrier wave, which system at the transmitter end contains a single-sideband generator followed by a frequency conversion stage and at the receiver end a single-sideband demodulator preceded by a frequency conversion stage, crystal-stabilized local oscillators being connected to at least the high-frequency conversion stages, while at the receiver end, for the reproduction of the local carrier wave associated with the single-sideband signal, a pilot oscillation is transmitted together with the single-sideband signal. The amplitude of the pilot oscillation generally is less (for example −20 db) than the amplitude of the sideband signal produced by the transmitted signal.

In a known single-sideband system of this kind, the carrier frequency associated with the transmitted single-sideband signals is used as the pilot oscillation and at the receiver end is selected in a pilot frequency filter and, after amplification in a pilot frequency amplifier, supplied to the AFC-means of a local oscillator. In order to reduce the likelihood of stabilization at interference signals, the pilot frequency filter must have a high selectivity, for example, a band-width of about 100 c./s. In the pilot frequency channel of such a receiver an amplification is required which exceeds the amplification required in the signal channel, especially since the pilot frequency normally is transmitted in attenuated form. These two requirements to be satisfied by the pilot frequency channel render the single-sideband system described comparatively expensive and bulky.

It is an objejct of the present invention to provide an advantageous transmission system of the kind described in the preamble, in which inter alia a considerable simplification of the single-sideband receiving system is obtained.

According to the invention, the single-sideband transmitter contains an audio-frequency pilot frequency-oscillator which has a frequency higher than the highest signal frequency and is connected to an input of the single-sideband generator, while at the receiver end there is connected to the output circuit of the single-sideband demodulator a pilot frequency filter which, through a limiter, is connected to an AFC-discriminator which is tuned to the audio-frequency pilot frequency and the output voltage of which is supplied to a frequency corrector which is coupled to a local oscillator of the receiver.

In order to reduce the influence of noise on the single-sideband communication, according to a further feature of the invention, at the transmitter end the low-frequency signals are also supplied to an amplitude detector followed by a low-pass filter in order to produce an envelope signal which contains at most the lowest signal frequencies to be transmitted and controls an amplitude modulator connected between the pilot frequency oscillator and the single-sideband generator, while at the receiver end there is connected to the output of the pilot frequency filter an amplitude detector which is followed by a low-pass filter and controls a modulator connected between the single-sideband demodulator and the reproducing device.

Figure 2:
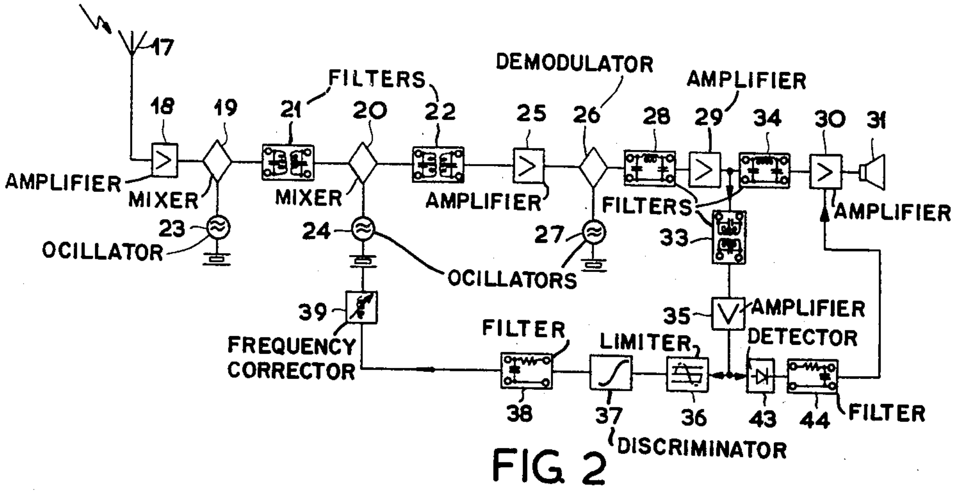

In order that the invention may readily be carried into effect, an embodiment thereof will now be described, by way of example, with reference to the accompanying diagrammatic drawings, in which FIG. 1 and FIG. 2 show an embodiment of a transmitter and a receiver, respectively, in a transmission system in accordance with the invention.

The radio transmitter for single-sideband transmission with suppressed carrier wave shown in FIG. 1 is provided with a microphone 1 which, through a filter 2 having a passband of from 0.3 to 2.7 kc./s., is connected to the cascade arrangement of two low-frequency amplifiers 3 and 4, the low-frequency amplifier 3 containing a volume contrast compression device 5 for reducing the level variations of the speech signals to, say a few db.

Furthermore, the single-sideband transmitter is provided with a single-sideband generator which is connected to the output of the low-frequency amplifier 4 and comprises a push-pull modulator 7, which is connected to a crystal oscillator 6 having a frequency of, for example, 250 kc./s., and a single-sideband filter 8, which selects the upper sideband of from 250.3 to 252.7 kc./s. and suppresses the lower sideband and the carrier frequency.

In the high-frequency transmitter cascade, the single-sideband signal of from 250.3 to 252.7 kc./s. is converted to the transmitter frequency in a mixer stage 9, which is connected to a crystal oscillator 13 and has an output filter 11, and in a succeeding mixer stage 10, which is connected to a crystal oscillator 14 and has an output filter 12. The frequencies of the crystal oscillators 13 and 14 are, for example, 1,150 kc./s. and 10,600 kc./s., respectively, so that by frequency conversion in the mixer stages 9 and 10 and selection of the upper sidebands in filters 11 and 12, a single-sideband signal is obtained which lies in the frequency band of from 12,000.3 to 12,002.7 kc./s. and is transmitted by means of a transmitting aerial 16 after amplification in a final amplifier 15.

In order to enable the carrier wave associated with the transmitted single-sideband signal to be exactly reproduced at the receiver end, there is transmitted together with the single-sideband signal a pilot frequency which is obtained by connecting an audio-frequency pilot frequency oscillator 32 having a frequency of, for example 3 kc./s., exceeding the highest speech frequency, to the single-sideband generator 7. In the single-sideband generator 7 and the succeeding mixer stages 9, 10 the audio-frequency pilot frequency of 3 kc./s. is converted to the transmitter output frequency so that together with the single-sideband signal, which lies in the frequency band of from 12,000.3 to 12,002.7 kc./s., there is transmitted a pilot frequency of 12,003 kc./s. the frequency spacing of which with respect to the carrier frequency associated with the single-sideband signal is accurately determined by the frequency of 3 kc./s. of the pilot frequency oscillator 32. Even with a simple design of the pilot frequency oscillator 32, this frequency spacing can be accurate to a fraction of one c./s. The level of the transmitted pilot frequency is made about 15 db lower than the level of the single-sideband signal produced by the transmitted signal.

FIG. 2 shows a single-sideband receiver which co-operates with the transmitter shown in FIG. 1. In the single-sideband receiver shown, the high-frequency signals which are received by an aerial 17 and comprise the single-sideband signal lying in the frequency band of from 12,000.3 to 12,002.7 kc./s. and the pilot frequency of 12,003.0 kc./s., after amplification in a high-frequency amplifier 18, are converted to a lower frequency for single-sideband demodulation in a mixer stage 19, which is connected to a crystal oscillator 23 and has an output filter 21, and a succeeding mixer stage 20, which is connected to a crystal oscillator 24 and has an output filter 22. In the embodiment shown, the frequencies of the crystal oscillators 23 and 24 are 10,600 kc./s. and 1,150 kc./s., respectively, so that by frequency conversion in the mixer stages 19 and 20 a single-sideband signal lying in the frequency band of from 250.3 to 252.7 kc./s. and a pilot frequency of 253.0 kc./s. are obtained, and these signals are supplied to an amplifier 25.

The single-sideband receiver furthermore is provided with a single-sideband demodulator which is connected to the output circuit of the amplifier 25 and comprises a pushpull demodulator 26 and a local carrier wave oscillator in the form of a crystal oscillator 27 connected to the pushpull modulator, the speech signals of from 0.3 to 2.7 kc./s. and the pilot frequency of 3 kc./s. taken from the output circuit of the pushpull demodulator 26 being supplied to an amplifier 29 through a low-pass filter 28. The speech signals of from 0.3 to 2.7 kc./s. are supplied, through a filter 34 suppressing the pilot frequency of 3 kc./s. and a low-frequency amplifier 30, to a reproducing device 31, the pilot frequency of 3 kc./s. being selected in a pilot-frequency filter 33 and supplied, after amplification in a pilot-frequency amplifier 35, through a limiter 36 to a frequency discriminator 37 which is tuned to the pilot frequency of 3 kc./s. and the output voltage of which, through a low-pass filter 38, controls a frequency corrector 39, for example a reactance tube, which is connected to the crystal oscillator 24.

If, in the single-sideband system described so far, the carrier frequency supplied by the local carrier wave oscillator 27 is in complete agreement with the carrier wave oscillation of the single-sideband signal supplied to the single-sideband demodulator 26, the frequency of the pilot frequency selected by the pilot frequency filter 33 is equal to the pilot frequency of 3 kc./s. produced by the pilot frequency oscillator 32 and at the frequency discriminator 32 tuned to this frequency no AFC-control voltage is produced in order to provide frequency adjustment of the oscillator 24. However, if the local carrier frequency of the oscillator 27 differs from this correct value, for example, owing to frequency variation of an oscillator in the transmitter or receiver cascade, the pilot frequency selected by the pilot frequency filter 33 also differs by the same amount from its nominal value of 3 kc./s. and the frequency discriminator 37 supplies a control voltage which counteracts the said frequency deviation, for example, reduces it by a factor of from 10 to 50. This arrangement ensures that the carrier frequency associated with the transmitted single-sideband signal is exactly reproduced by the local carrier wave oscillator 27, for example, to within one or a few c./s.

Owing to the low-frequency selection of the pilot frequency, in the described single-sideband system a simple pilot frequency filter enables a sufficient selectivity to be obtained substantially to prevent undesirable influences of interference frequencies on the AFC control. In addition to a simple design of the pilot frequency filter 33, the pilot frequency, which is already materially amplified in the amplifiers 18, 25 and 29, must only be further amplified in a comparatively low degree in the AFC-loop, for example by 30 to 40 db, and this permits the use of a simple pilot frequency amplifier 35, for example, a single stage amplifier.

It should be noted that in order to provide AFC-control in the amplifier shown in FIG. 2, the tuning of the local oscillator 23 or 27 may be varied instead of the tuning of the local oscillator 24. However, in general an adjustment of the first local oscillator, in the present case the oscillator 23, is contrary to the particularly high stability requirements it has to satisfy. This difficulty does not arise if the local oscillator 27 of the demodulator is used to provide AFC. However, in this event allowance must be made for the fact that the frequency position of the received single-sideband signal in relation to the single-sideband filter 25 is not corrected by the AFC-control, and this can provide difficulty in some cases. Furthermore, according to the invention, in the described single-sideband arrangement an effective reduction of the influence of noise on the single-sideband communication can be effected in a simple manner by using the elements provided for the AFC-control.

For this purpose the speech signals taken from the low-frequency amplifier 3 are also supplied to an amplitude detector 40 succeeded by a low-pass filter 41 in order to produce an envelope signal which at most contains the lowest of the speech frequencies to be transmitted, for example the cut-off frequency of the low-pass filter 41 is made from 100 to 40 c./s. for this purpose. The envelope signal obtained controls an amplitude modulator 42 connected between the pilot frequency oscillator 32 and the single-sideband modulator 7, the amplitude-modulated pilot frequency signal, after frequency conversion in the single-sideband generator 7 and the mixer stages 9 and 10, being transmitted by the aerial 16 together with the single-sideband signals. In order to obtain uniform transmitter loading, it is of advantage to design the amplitude modulator 42 so that in the absence of speech signals a pilot frequency signal having maximum amplitude is transmitted, this amplitude decreasing with increasing intensity of the speed signals.

At the receiver end, the amplitude-modulated pilot frequency signal is supplied, after selection in the pilot frequency filter 33 and amplification in the pilot frequency amplifier 35, to an amplitude detector 43 and a low-pass filter 44 in order to recover the envelope signal which controls the amplifier 30 preceding the reproduction device 31. The design of the low-pass filter 44 can be similar to that of the low-pass filter 41 used at the transmitter end.

In the system described, the amplifier 30 is cut off by the envelope signal in the absence of a speech signal and rendered conductive in the presence of a speech signal, so that in the speech intervals the noise is suppressed, and this results in an appreciable improvement of the apparent signal to noise ratio. Hence for the speech communication between the transmitter and the receiver a smaller transmitter power is sufficient, for example, the transmitter power may be reduced by from 3 to 5 db and this results in a further simplification of the described single-sideband system.

Under certain circumstances, it may be of importance to improve the selectivity of the AFC-loop, for example by connecting an additional pilot frequency filter to the output of the limiter 36. If required, for this purpose use may be made of the selectivity of the frequency discriminator 37.

At this point it should be remarked that a phase discriminator may be substituted for the frequency discriminator 37 in the AFC-loop. For this purpose, the pilot frequency taken from the limiter 36 is supplied to a mixer stage which is connected to a local oscillator having a frequency of 3 kc./s. and the output voltage of which controls the frequency corrector 39 through the low-pass filter 38. The stability requirements to be satisfied by the AFC-loop are comparatively stringent when a phase discriminator is used. Consequently the use of a frequency discriminator is to be preferred for simple arrangements.

What is claimed is:

1. A suppressed carrier single-sideband transmission system comprising a transmitter and a receiver; said transmitter comprising a source of input signals to be transmitted, a source of an audio frequency pilot oscillation, a source of a carrier oscillation, and single-sideband modulator means connected to modulate said carrier oscillations with said input signals and said pilot oscillation to provide a single-sideband output signal with the information relating to said input signals and pilot oscillation in the same sideband; said receiver comprising a source of local oscillations, demodulator means, means applying said local oscillations and said single-sideband signal to said demodulator to demodulate said single-sideband signals, filter means for separating said pilot oscillations from the output of said demodulator means, frequency corrector means connected to said source of local oscillations; automatic frequency control discriminator means tuned to the original frequency of said pilot oscillations, means applying said separated pilot oscillations to said discriminator means to provide a control voltage, and means applying said control voltage to said frequency corrector means.

2. A suppressed carrier single-sideband transmission system comprising a transmitter and a receiver; said transmitter comprising a source of input signals, a source of an audio frequency pilot oscillation, a source of a carrier oscillation, envelope signal producing means comprising means for amplitude detecting said input signals to provide an envelope signal having a maximum frequency no greater than the lowest frequency of said input signal, means modulating said pilot signal with said envelope signal and means for modulating said carrier oscillations with said input signal and said modulated pilot oscillations to provide a single-sideband signal with the information relating to said modulated pilot oscillations and input signal in the same sideband; said receiver comprising a source of local oscillations, demodulator means, means applying said local oscillations and single-sideband signals to said demodulator, filter means for separating said modulated pilot oscillations from the output of said demodulator, amplitude detector means, means applying said modulated pilot oscillations to said amplitude detector means to recover said envelope signal, means modulating the output of said demodulator from which said modulated pilot oscillations have been removed with said envelope signal, limiter means for limiting said modulated pilot oscillations, automatic frequency control discriminator means tuned to the frequency of said pilot oscillations at said transmitter, means applying said limited pilot oscillations to said discriminator means to provide a control voltage, frequency corrector means connected to control the frequency of said local oscillations, and means applying said control voltage to said frequency corrector means.

3. A transmitter for a suppressed carrier single-sideband transmission system comprising a source of input signals, a source of an audio frequency pilot oscillation, a source of a carrier oscillation, envelope signal producing means comprising means for amplitude detecting said input signals to provide an envelope signal having a maximum frequency no greater than the lowest frequency of said input signal, means modulating said pilot signal with said envelope signal, and means for modulating said carrier oscillations with said input signal and said modulated pilot oscillations to provide a single-sideband signal with the information relating to said modulated pilot oscillations and input signal in the same sideband.

4. A receiver for receiving suppressed carrier single-sideband signals of the type in which input signals and pilot oscillations are modulated on the same sideband of a carrier oscillation, said receiver comprising a source of local oscillations, demodulator means, means applying said local oscillations and said single-sideband signal to said demodulator to demodulate said single-sideband signals, filter means for separating said pilot oscillations from the output of said demodulator means, frequency corrector means connected to said source of local oscillations, automatic frequency control discriminator means tuned to the original frequency of said pilot oscillations, means applying said separate pilot oscillations to said discriminator means to provide a control voltage, and means applying said control voltage to said frequency corrector means.

5. A receiver for receiving suppressed carrier single-sideband signals of the type in which input signals and audio frequency pilot oscillations are modulated on the same sideband of a carrier oscillation, and in which the pilot oscillations are modulated with an envelope signal that is derived by amplitude detecting and frequency limiting the input signals, said receiver comprising a source of local oscillations, demodulator means, means applying said local oscillations and single-sideband signals to said demodulator, filter means for separating said modulated pilot oscillations from the output of said demodulator, amplitude detector means, means applying said modulated pilot oscillations to said amplitude detector means to recover said envelope signal, means modulating the output of said demodulator from which said modulated pilot oscillations have been removed with said envelope signal, limiter means for limiting said modulated pilot oscillations, automatic frequency control discriminator means tuned to the frequency of said pilot oscillations at said transmitter, means applying said limited pilot oscillations to said discriminator means to provide a control voltage, frequency corrector means connected to control the frequency of said local oscillations, and means applying said control voltage to said frequency corrector means.

References Cited in the file of this patent

UNITED STATES PATENTS

| | | |
|---|---|---|
| 2,455,959 | Van Der Mark et al. | Dec. 14, 1948 |
| 2,699,494 | Albricht | Jan. 11, 1955 |

FOREIGN PATENTS

| | | |
|---|---|---|
| 636,467 | Great Britain | May 3, 1950 |